United States Patent [19]

Inoue

[11] Patent Number: 4,605,886
[45] Date of Patent: Aug. 12, 1986

[54] FEED-DEVIATION PREVENTIVE PATH-CONTROLLED MACHINING METHOD AND APPARATUS

[75] Inventor: Kiyoshi Inoue, Tokyo, Japan

[73] Assignee: Inoue-Japax Research Incorporated, Kanagawaken, Japan

[21] Appl. No.: 646,623

[22] Filed: Aug. 31, 1984

[30] Foreign Application Priority Data

Sep. 2, 1983 [JP] Japan ............................... 58-160419
Sep. 16, 1983 [JP] Japan ............................... 58-169395

[51] Int. Cl.$^4$ ............................................. G05B 23/02
[52] U.S. Cl. .................................... 318/565; 318/577
[58] Field of Search ................. 318/565, 577; 364/184

[56] References Cited

U.S. PATENT DOCUMENTS

| | | | |
|---|---|---|---|
| 3,633,087 | 1/1972 | Vawter et al. ...................... | 318/565 |
| 3,860,862 | 1/1975 | Dell et al. ......................... | 318/577 X |
| 3,932,743 | 1/1976 | Sitnichenko et al. ............ | 318/577 X |
| 4,059,788 | 11/1977 | Vasiliev et al. .................... | 318/577 |
| 4,355,362 | 10/1982 | Imazeki . | |
| 4,441,020 | 4/1984 | Sakamoto et al. ................ | 318/577 X |
| 4,449,699 | 5/1984 | Ashizawa et al. ................ | 318/577 X |
| 4,450,014 | 5/1984 | Hayasaki et al. ................ | 318/577 X |

FOREIGN PATENT DOCUMENTS

| | | |
|---|---|---|
| 0062074 | 10/1982 | European Pat. Off. . |
| 1944687 | 3/1971 | Fed. Rep. of Germany . |
| 1790186 | 12/1973 | Fed. Rep. of Germany . |
| 2604843 | 11/1977 | Fed. Rep. of Germany . |
| 2818058 | 11/1978 | Fed. Rep. of Germany . |
| 3021669 | 1/1981 | Fed. Rep. of Germany . |
| 3035098 | 2/1981 | Fed. Rep. of Germany . |
| 3205884 | 9/1982 | Fed. Rep. of Germany . |
| 3311124 | 10/1983 | Fed. Rep. of Germany . |
| 538329 | 5/1971 | Switzerland . |

*Primary Examiner*—B. Dobeck
*Attorney, Agent, or Firm*—Karl F. Ross; Herbert Dubno

[57] ABSTRACT

A feedpath deviation preventive NC path-controlled machining system in which a plotting unit is used, in a preliminary operation in advance of a machining operation, to produce on a record medium a continuous plot equivalent to a programmed machining feed path to be followed by relative displacement between the tool member and the workpiece during the machining operation. In the latter, a sensing head is disposed in sensing relationship with the plotted record medium for relative displacement to the latter jointly with the relative displacement between the tool member and the workpiece. The sensing head continues to trace the continuous plot as long as the actual machining relative displacement proceeds along the programmed machining path to produce an OK signal. An output circuit unit is provided to respond to any disappearance of the OK signal representing a deviation of the actual displacement from the programmed path for providing a warning signal and/or a control signal which acts to deactuate the machining-feed drive system.

4 Claims, 4 Drawing Figures

FEED-DEVIATION PREVENTIVE PATH-CONTROLLED MACHINING METHOD AND APPARATUS

FIELD OF THE INVENTION

The present invention relates to numerically path-controlled machining, e.g. electroerosion or electrical machining, in which drive means operates under the command of a numerical controller to advance a tool (e.g. electrode) and a workpiece relatively along a programmed feed path while material removal from the workpiece proceeds by machining actions caused at a machining interface or gap between the relatively advancing tool and workpiece whereby a desired form is generated in the workpiece. In particular the invention relates to an improved numerically path-controlled machining method and apparatus in which a safeguard against a machining error is provided.

BACKGROUND OF THE INVENTION

In the last decade, a numerical control (NC) system for controlling a machining feed required to achieve a desired machining geometry have been increasingly adopted, not only for conventional milling, grinding and other machines but especially in combination with more sophisticated, electroerosion or electrical machining techniques, e.g. electrical discharge machining (EDM), electrochemical machining (ECM), electrochemical-discharge machining (ECDM), electrochemical grinding (ECG) and electrochemical-mechanical grinding (ECMG). This increased, more sophisticated adoption of NC systems is represented by the today's ever wide-spread use in the industry of highly automated traveling-wire (TW) and other "generic electrode" EDM machines capable of machining a die, mold or like highly intricate or "difficult to machine" article more efficiently than ever before. While an NC system may also be employed for sinking-type electroerosion (e.g. EDM) machines utilizing a formed tool electrode, the electrical machining (e.g. EDM) capabilities have been largely expanded in the form of "generic electrode" electroerosion (e.g. EDM) machining equipped with an NC unit. In these machines, the tool electrode is a wire, tape, cylindrical rod or like simple electrode and any be used to impart a complex shape to a workpiece with due precision.

Dies, molds or like articles as referred to have their own severe specifications to meet their particular purposes so that each must be prepared from a relatively expensive blank material and yet machined individually with an extremely high degree of machining precision. Furthermore, an extensive machining time ranging from an hour to days is needed to finish generating a required complete shape from the blank material. Such a die, mold or like article which can be efficiently machined with a numerically controlled (NC) machine, especially but not exclusively electroerosion machine, is thus of high value and price, any accidental machining error during its course of machining is of vital problem.

In an NC machine (e.g. EDM machine), the assigned function of the NC system is to effect a machining feed required to follow stock removal at the machining interface (e g. discharge erosion at the EDM gap) and to enable the stock removal (e.g. discharge erosion) to continue precisely along a programmed path. The machining feed is effected by means of a succession of drive pulses based upon digital commands programmed on a record medium so that the desired relative advancement may be performed as accurately as possible in accordance with the programmed commands. Motor means such as a DC motor or stepping motor for energization by the drive pulses is drivingly coupled to a drive member such as a leadscrew which is in turn connected to support means for the movable tool electrode or workpiece. Each individual drive pulse is, for the sake of precision, typically designed to effect an increment of the relative advancement as small as 1 $\mu$m or less, and is furnished over a fraction of a second. Such successive drive pulses must be consecutively furnished to the motor means throughout the prolonged machining operation as mentioned above to continue the required machining feed precisely along the programmed feed path.

Such drive systems, however, commonly entail conversion of electrical to mechanical signals and further mechanical conversion of rotary to longitudinal signals or displacements. Thus, it has been recognized that mechanical 'error' may develop in the stages of conversion due, for example, to an error in the lead or pitch of a lead screw and a backlash in various components. Furthermore, of even greater importance is the discovery that changes in gap conditions and machining parameters including tool or electrode geometry may prevent each NC command from being precisely reflected in an actual amount of material removed and hence on the corresponding machining feed or relative displacement. As a result, it is possible that minor deviations occurring from time to time for one or more of these various causes will accumulate to result in a serious machining error in the workpiece and a consequent irreparable damage thereof.

OBJECT OF THE INVENTION

The present invention, therefore, seeks to provide an improved numerically path-controlled machining method and apparatus whereby workpiece damage due to such machining errors is minimized.

SUMMARY OF THE INVENTION

In accordance with the present invention there is provided, in a first aspect thereof, a method of machining a workpiece to generate a desired contour therein by means of a numerically path-controlled machine tool having first support means for supporting the workpiece, tool support means supported by second support means for positioning a tool member in machining relationship with the workpiece in a machining operation and drive means drivingly coupled with at least one of the first and second support means and operable in response to a predetermined sequential set of numerical commands for relatively displacing the first and second support means to correspondingly relatively displace the tool member and the workpiece along a prescribed machining feed path such as to generate the desired contour therein in the machining operation, which method comprises: disposing and maintaining a record medium in a fixed positional relationship with one of the said first and second support means; in a preliminary operation in advance of the machining operation, disposing and maintaining plotting means in a fixed positional relationship with the other of the said first and second supporting means while maintaining the plotting means in plotting engagement with the said record medium, and furnishing the said drive means with the the said predetermined sequential set of numerical commands whereby the consequential relative displacement between the said first and second support means results in corresponding relative displacement between the said plotting means and the said record medium to produce a continuous plot equivalent to the said prescribed machining feed path on the said record medium; and in the said machining operation, disposing and maintaining sensing means in a fixed positional relationship with the said other support means and in sensing engagement with the said plotted record medium on the said one support means so that the said sensing means and the said record medium are relatively displaced as the said first and second support means are relatively displaced by the said drive means furnished with the said predetermined sequential set of numerical commands to continuously trace the said continuous plot and produce an OK signal as long as the commanded relative displacement between the tool member and the workpiece proceeds along the said prescribed machining feed path, and detecting a deviation of the said commanded relative displacement from the said prescribed machining feed path at any point thereon by sensing a disappearance of the said OK signal. The method may further comprise deactuating the said drive means in response to the said disappearance of the OK signal. The said continuous plot may be composed of an electrically conductive substance and the said sensing means may comprise an electrical conductor adapted for electrical contact with the said conductive plot.

The present invention also provides, in a second aspect thereof, an apparatus for machining a workpiece to generate a desired contour therein, which comprises: first support means for supporting the workpiece; tool support means supported by second support means for positioning a tool member in machining relationship with the workpiece in a machining operation; drive means drivingly coupled with at least one of the said first and second support means for relatively displacing them; a record medium for arrangement in a fixed positional relationship with one of the said first and second support means throughout the said machining operation and a preliminary operation in advance thereof; plotting means operable, while held in a fixed positional relationship with the other of the said first and second support means, in the said preliminary operation and displaceable relative to the said record medium while maintaining plotting engagement therewith as the said first and second support means are relatively displaced by the said drive means; control means operable in the said machining operation for furnishing the said drive means with a predetermined sequential set of drive commands whereby the consequential relative displacement between the said first and second support means results in relative displacement between the said tool member and the workpiece along a predetermined machining feed path such as to generate the said desired contour in the workpiece, the said control means being also operable in the said preliminary operation for furnishing the said drive means with the said predetermined sequential set of drive commands whereby the consequent relative displacement of the said first and second support means results in relative displacement between the said plotting means and the said record medium to produce a continuous plot equivalent to the said predetermined machining path on the said record medium; sensing means operable, while held in a fixed positional relationship with the said other support means, in the said machining operation and displaceable relative to the said record medium as the said first and said support means are relatively displaced by the said drive means furnished with the said predetermined sequential set of drive commands so as to continuingly trace the said continuous plot on the said record medium and produce on OK signal as long as the commanded relative displacement between the said tool member and the said workpiece proceeds along the said predetermined machining path; and output means associated with the said sensing means and responsive to a disappearance of the said OK signal representing a deviation of the said commanded relative displacement from the said predetermined machining path on any point thereon for producing an output signal representing the said deviation. Preferably, means is provided responsive to the said output signal for deactuating the said drive means in the said machining operation.

BRIEF DESCRIPTION OF THE DRAWING

These and other features of the present invention as well as advantages thereof will become more readily apparent from the following description, given by way of example, with reference to the accompanying drawing in which.

SPECIFIC DESCRIPTION

Figure 1:
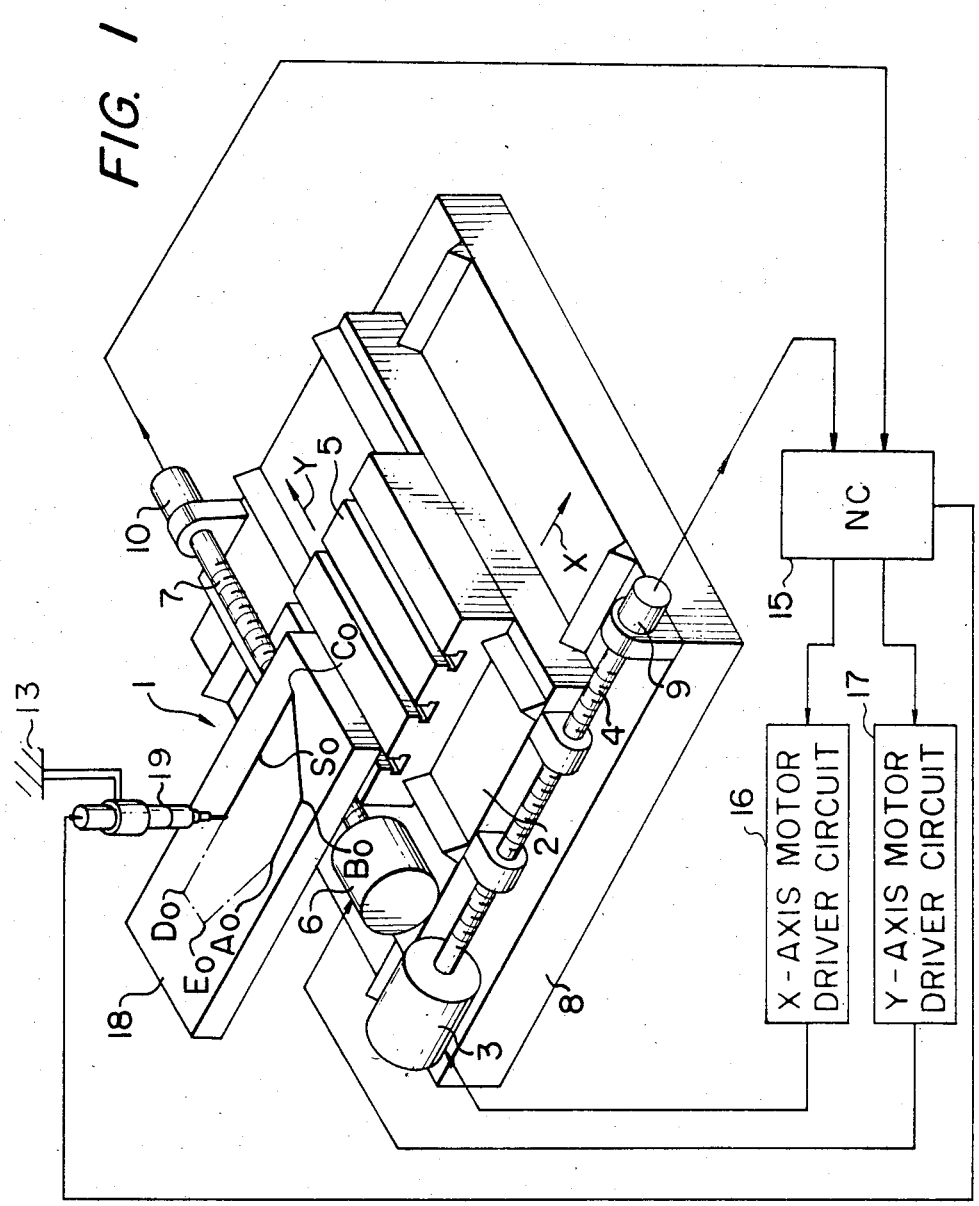
FIG. 1 is a schematic view essentially perspective, illustrating a system according to the invention, there being shown means for plotting, prior to a machining operation, a programmed machining path to be followed by relative displacement between a tool member and a workpiece during the machining operation, on a record medium in accordance with the principles of the present invention.
Figure 2:
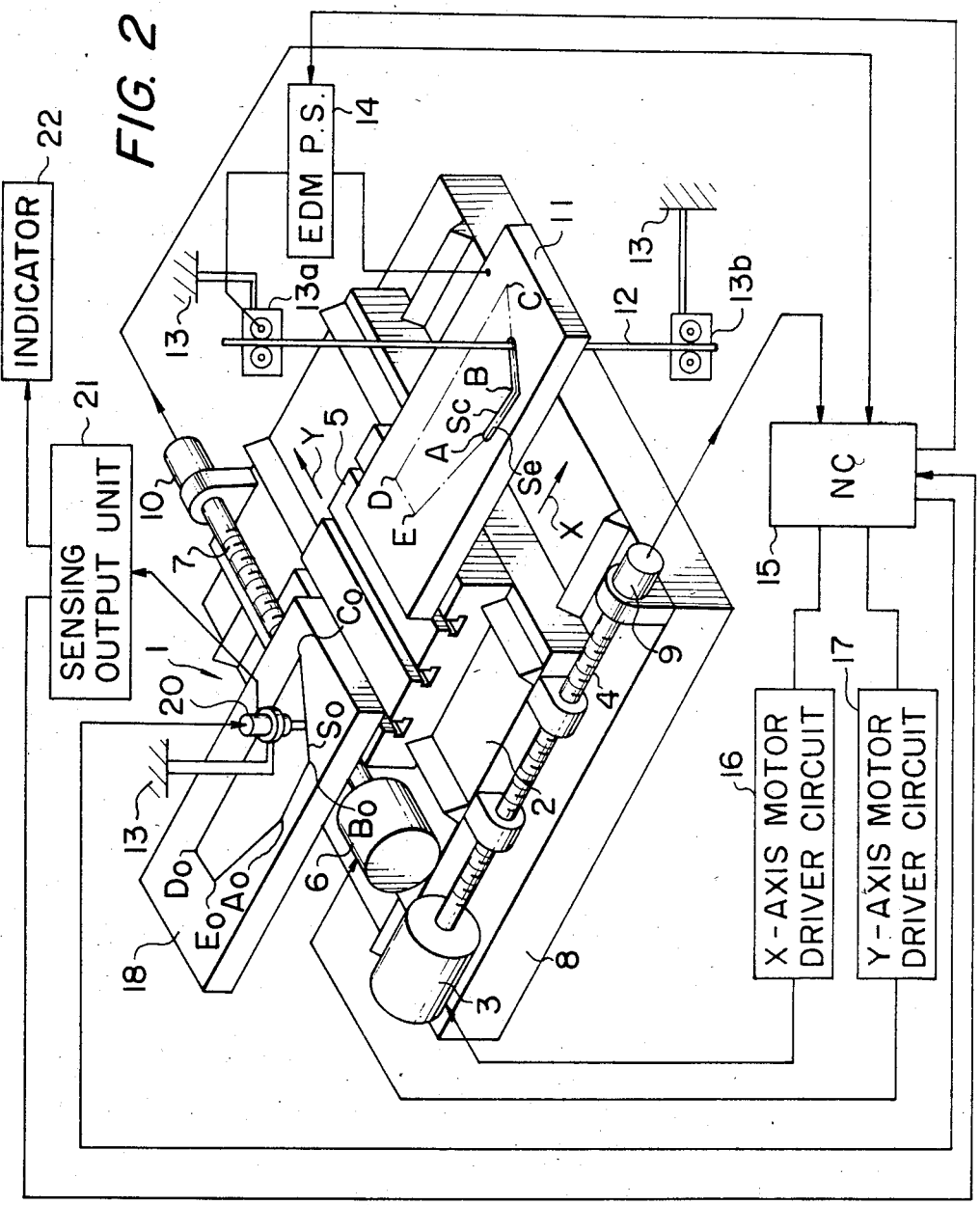
FIG. 2 is a similar view illustrating the system for machining the workpiece with the tool member, including a sensing head for tracing the continuous plot on the record medium while the tool member and the workpiece are relatively displaced.

Referring now to FIGS. 1 and 2, the system illustrated by way of preferred example includes a compound drive worktable assembly 1 in the form of a conventional cross-slide arrangement. The assembly 1 comprises a first drive table 2 driven by a motor 3 via a leadscrew 4 and a second drive table 5 driven by a motor 6 via a leadscrew 7. The first drive table 2 is slidably mounted on a base table 8 for displacement in the direction of an X-axis and the second drive table 5 is slidably mounted on the first drive table 2 for displacement in the direction of a Y-axis. Encoders 9 and 10 are provided in rotation sensing relationship with the X-axis leadscrew 4 and Y-axis lead screw 7, respectively. In FIG. 2, a workpiece 11 is shown securely mounted on the second table 5 by means of a suitable clamp (not shown).

A tool shown at 12 in FIG. 2 is here by preferred example a generic electroerosion electrode whose active electrode contour is simple such as cylindrical and generally independent of the contour to be machined in the workpiece 11. It is shown, for the illustrative purposes, in the form of a wire electrode for carrying out a traveling-wire EDM process. The wire electrode is typically of a diameter or thickness ranging between 0.05 and 0.5 mm. It is assumed that the process is here to generate in the workpiece 11 an intricate two-dimensional contour Sc. The wire electrode 12 is arranged to traverse the conductive workpiece 11 which is in the form of a rectangular block, while maintaining its axis perpendicular to the upper and lower surfaces thereof. The wire electrode 12 is continuously dispensed from a supply reel (not shown) onto a suitable takeup means (not shown) and is guided between a pair of machining guides 13a and 13b to provide a continuously traveling and renewing linear cutting stretch in the region of the workpiece 11. The guides 13a and 13b, which thus serve to position the tool member 12 in machining relationship with the workpiece 11, are supported securely on a support assembly 13 which is, in the embodiment illustrated, fixed in position. The cutting region is kept continuously supplied with a machining (dielectric) fluid, which may be a deionized water liquid, from, say, one or two fluid delivery nozzles (not shown) typically disposed at the two opposite sides of the workpiece 11.

An electroerosion power supply 14 is connected electrically to the wire electrode 12 and the workpiece 11. The power supply 14 typically comprises a DC source, a power switch and a resistor connected in series therewith. The switch is alternately turned on and off in response to a succession of signal pulses from an oscillator to pulse the output of the DC source and thus provide a succession of the electrical voltage pulses each having a controlled amplitude, pulse duration and pulse interval, between the wire electrode 12 and the workpiece 11 across a machining gap defined therebetween in the presence of the machining fluid. These voltage pulses produce a succession of discrete, time-spaced electrical discharges effective to electroerosively remove material from the workpiece 11. These components of the EDM power supply 14, which are well known in the art, are thus omitted from illustration and no further discussion of the operation thereof is necessary.

To enable material removal to proceed so as to generate the machined contour Sc in the workpiece 11, the axis of the traveling wire electrode 12 must be advanced effectively through the workpiece along a path Se which corresponds to the desired contour Sc and is spaced therefrom generally by a distance equal to the radius of the wire electrode 12 plus the lateral overcut or the maximum size of the machining gap. A numerical controller 15 of a conventional design has a predetermined sequential set of numerical data or instructions prestored or computed therein to enable advance of the wire axis through the workpiece 11 along the path Se. This sequential set of data is sequentially converted into X-axis and Y-axis drive pulses which are furnished from the NC unit 15 to the X-axis and Y-axis motors 3 and 6 via their respective driver circuits 16 and 17 to enable the corresponding advance of the workpiece 11 relative to the axis of the traveling wire electrode 12. Each of the drive pulses applied to the X-axis and Y-axis motors 16 and 17 is set to achieve a prescribed unit distance, say 1 μm, of displacement of the workpiece 11 relative to the wire electrode 12 along the corresponding X- or Y-axis. The encoders 9 and 10 are provided to sense each incremental rotary advancement of the driven leadscrews 4 and 7 to apply feedback signals to the NC unit 15 or the driver circuits 16, 17, thus accomplishing closed-loop drive control.

As shown, the system further comprises a record member or medium 18 held in a fixed positional relationship with the workpiece support 5 and the tool support assembly 13. In the embodiment here illustrated, the record medium is securely mounted on the drive table 5 by means of a clamp (not shown). In a preliminary operation in advance of the machining operation, the record medium 18 is so secured and a plotting instrument 19 under a command signal from the NC unit 15 is brought into plotting engagement with the record medium 18. In the embodiment illustrated, the plotting instrument 19 comprises a pen or pencil and, as shown, is held secured to the tool support assembly 13.

In the preliminary operation, the drive motor system 3, 16; 6, 17 is furnished from the NC unit 15 with the same sequential set of numerical commands as that with which it is to be furnished in the machining operation to displace the support table 5 relative to the support assembly 13. As a result, a continuous plot So is produced by the plotting instrument 19 on the record medium 18, this plot So being, as shown, equivalent to the desired machining path Se.

In the subsequent machining operation, the record medium 18 with the continuous plot So thereon remains secured on the support table 5 which has now the workpiece 11 securely mounted in position thereon relative to the tool member 12 as shown in FIG. 2. A sensing head 20 is also shown to have replaced the plotting instrument 19. The sensing head 20 is so positioned under a command of the NC unit 15. The sensing head 20 is held secured on the support assembly 13 as the drive system is energized with the foregoing sequential set of numerical commands to displace the workpiece 11 relative to the tool member 12.

As long as this displacement remains on the programmed path Se, the sensing head 20 continues to sense the plot So and produce an OK signal. An output unit 21 is associated with the sensing unit 20 and responds to a disappearance of the OK signal which is representative of a deviation of the machining displacement from the programmed path on any point thereon, thus producing an output signal which can be converted at an indicator 22 into an audible and/or visible warning signal indicating the said deviation and can also be fed into the NC unit 15 to deactuate the drive system 3, 16; 6, 17.

Figure 3:
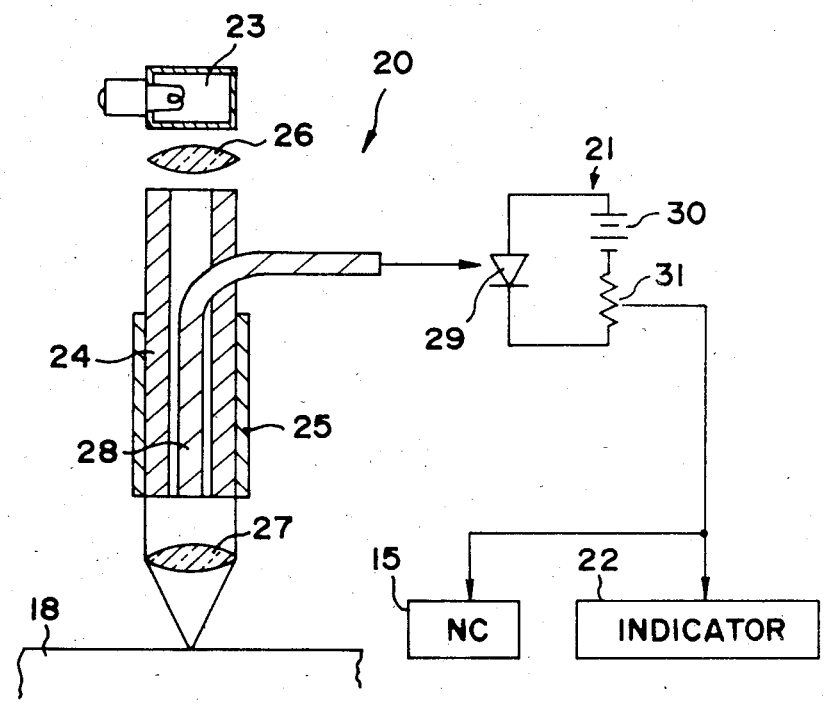
FIG. 3 is a sectional diagrammatic view illustrating an embodiment of the sensing head shown in FIG. 2.

As shown in FIG. 3, the sensing head 20 may make use of an optical system comprising a light source 23, a tubular incident optical guide 24 held in a support ring 25, lenses 26, 27 and an output or light-reception optical guide 28 coaxial with the incident guide 24 and led to a photo diode 29 connected in series with a DC source 30 and a sensing resistor 31. As long as the incident light is intercepted by the plot So on the record medium 18, the photo diode 29 remains inactive. The photo diode 29 is rendered conductive when the incident light deviates from the continuous plot So to produce a voltage drop at the sensing resistor 31 which is applied to produce the warning signal at the indicator 22 on the one hand and to produce the drive interruption at the NC unit 15 on the other hand.

Figure 4:
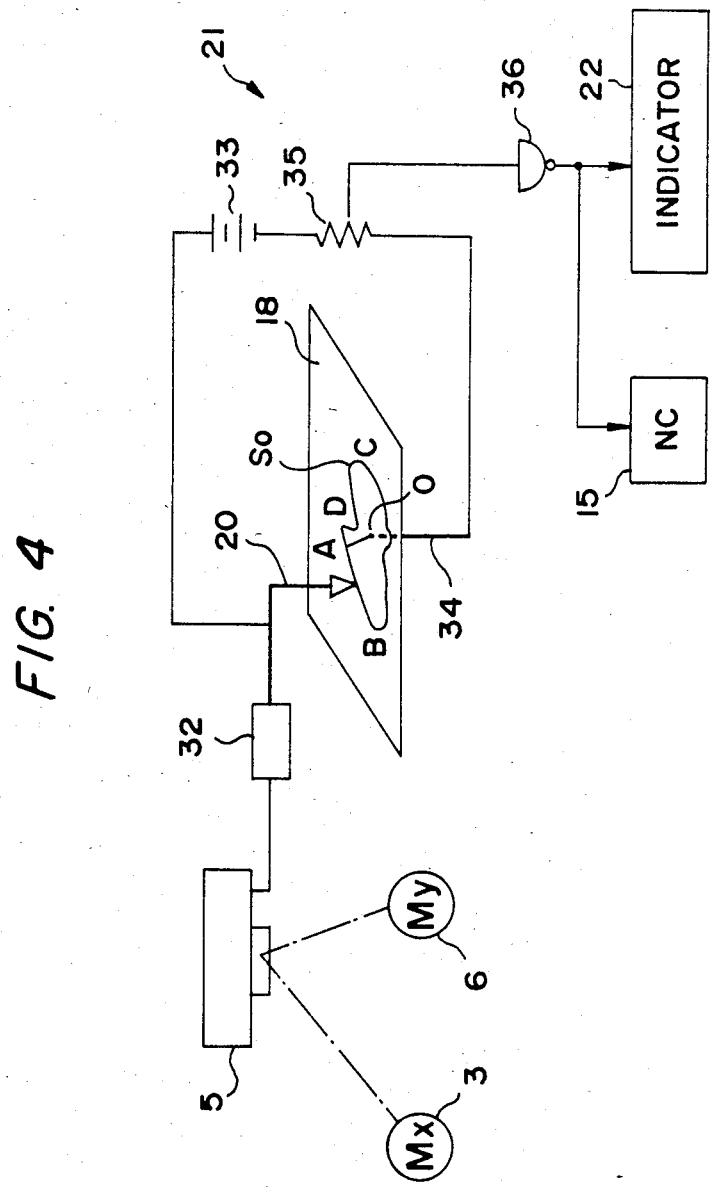
FIG. 4 is a diagrammatic view illustrating another embodiment of the apparatus according to the invention.

The continuous plot So is preferably made of a conductive ink on a nonconductive record medium 18. The conductive ink can be prepared by introducing conductive particles into an ink. In the system of FIG. 4, the sensing head 20 is securely connected via an electrical insulator 32 to the worktable 5 which is driven by the X-axis and Y-axis motors 3, 6 to carry the workpiece 11.

In the machining operation, the sensing head 20 starting with the point O corresponding to a machining starting position on the workpiece 11 is designed to trace the electrically conductive, continuous plot So produced on the nonconductive record member or medium 18. The sensing head 20 is constituted by a conductive member electrically connected to one terminal of a DC source 33. Another conductive member 34 is led from the point O and connected to the other terminal of the DC source 33 via a sensing resistor 35. As long as the sensing head 20 remains moving on the conductive plot 18, a voltage drop is produced at the sensing resistor 35. When, however, the conductor 20 departs from the conductive path 18, representing a deviation of the actual machining displacement from the programmed path Se, the series circuit will be broken and the voltage drop at the resistor 35 will disappear. The signal at the resistor 35 is inverted by the NOT gate 36 to produce the warning signal at the indicator 22 on the one hand and to act on the NC unit 15 to interrupt the operation of the machining drive system 3, 6 on the other hand.

The continuous plot So may alternatively be made of a magnetically susceptible material, which may be employed in conjunction with a magnetic sensing head constituting the sensing head 20. The magnetically susceptible ink may be prepared by introducing magnetic particles into an ink. For the plotting instrument 19, a cathode-ray tube may also be employed to produce a permanent image constituting the continuous plot So, which may be detected by an optical sensing head as has been described.

What is claimed is:

1. A method of machining a workpiece to generate a desired contour therein by means of a numerically path-controlled machine tool having first support means for supporting the workpiece, tool support means supported by second support means for positioning a tool member in machining relationship with the workpiece in a machining operation and drive means drivingly coupled with at least one of the first and second support means and operable in response to a predetermined sequential set of numerical commands for relatively displacing the first and second support means to correspondingly relatively displace the tool member and the workpiece along a prescribed machining feed path such as to generate the desired contour therein in the machining operation, the method comprising the steps of:

disposing and maintaining a record medium in a fixed positional relationship with one of said first and second support means;

in a preliminary operation in advance of said machining operation, disposing and maintaining plotting means in a fixed positional relationship with the other of said first and second supporting means while maintaining the plotting means in plotting engagement with said record medium, and furnishing said drive means with said predetermined sequential set of numerical commands whereby the consequential relative displacement between said first and second support means results in corresponding relative displacement between said plotting means and said record medium to produce a continuous plot equivalent to said prescribed machining feed path on said record medium and in the form of a visible trace; and in said machining operation, disposing and maintaining sensing means in a fixed positional relationship with said other support means and in sensing engagement with said plotted record medium on said one support means so that said sensing means and said record medium are relatively displaced as said first and second support means are relatively displaced by said drive means furnished with said predetermined sequential set of numerical commands to continuously trace said continuous plot and optically produce an OK signal as long as the commanded relative displacement between the tool member and the workpiece proceeds along said prescribed machining feed path, and detecting a deviation of said commanded relative displacement from said prescribed machining feed path at any point thereon by sensing a disapperance of said OK signal.

2. The method defined in claim 1, further comprising the step of deactuating said drive means in response to said disappearance of the OK signal.

3. An apparatus for machining a workpiece to generate a desired contour therein, comprising:

first support means for supporting the workpiece;

tool support means supported by second support means for positioning a tool member in machining relationship with the workpiece in a machining operation;

drive means drivingly coupled with at least one of said first and second support means for relatively displacing them;

a record medium for arrangement in a fixed positional relationship with one of said first and second support means throughout said machining operation and a preliminary operation in advance thereof;

plotting means operable, while held in a fixed positional relationship with the other of said first and second support means, in said preliminary operation and displaceable relative to said record medium while maintaining plotting engagement therewith as said first and second support means are relatively displaced by said drive means;

control means operable in said machining operation for furnishing said drive means with a predetermined sequential set of drive commands whereby the consequential relative displacement between said first and second support means results in relative displacement between said tool member and said workpiece along a predetermined machining path such as to generate said desired contour in the workpiece, said control means being also operable in said preliminary operation for furnishing said drive means with said predetermined sequential set of drive commands whereby the consequential relative displacement of said first and second support means results in relative displacement between said plotting means and said record medium to produce a continuous plot in the form of a visible trace equivalent to said predetermined machining path on said record medium;

sensing means operable, while held in a fixed positional relationship with said other support means, in said machining operation and displaceable relative to said record medium as said first and said support means are relatively displaced by said drive means furnished with said predetermined sequential set of drive commands so as to continuingly trace said continuous plot on said record medium optically and produce an OK signal as long as the commanded relative displacement between said tool member and said workpiece proceeds along said predetermined machining path; and output means associated with said sensing means and responsive to a disappearance of said OK signal representing a deviation of said commanded relative displacement from said predetermined machining path on any point thereon for producing an output signal representing said deviation.

4. The apparatus defined in claim 1, further comprising second control means responsive to said output signal for deactuating said drive means in said machining operation.

* * * * *